US 7,213,148 B2

(12) United States Patent
Anand (10) Patent No.: US 7,213,148 B2
(45) Date of Patent: May 1, 2007

(54) APPARATUS AND METHOD FOR A HASH PROCESSING SYSTEM USING INTEGRATED MESSAGE DIGEST AND SECURE HASH ARCHITECTURES

(75) Inventor: Satish N. Anand, Chandler, AZ (US)

(73) Assignee: Corrent Corporation, Tempe, AZ (US)

( * ) Notice: Subject to any disclaimer, the term of this patent is extended or adjusted under 35 U.S.C. 154(b) by 611 days.

(21) Appl. No.: 10/144,197

(22) Filed: May 13, 2002

(65) Prior Publication Data

US 2002/0191792 A1 Dec. 19, 2002

Related U.S. Application Data

(60) Provisional application No. 60/297,876, filed on Jun. 13, 2001, provisional application No. 60/340,013, filed on Dec. 10, 2001.

(51) Int. Cl.
*H04L 9/00* (2006.01)
(52) U.S. Cl. ............... 713/168; 713/181; 380/28
(58) Field of Classification Search ............... 713/168, 713/174, 181; 380/28
See application file for complete search history.

(56) References Cited

U.S. PATENT DOCUMENTS

| | | | |
|---|---|---|---|
| 5,664,016 A | 9/1997 | Prenell et al. ............... 380/28 |
| 5,673,318 A | 9/1997 | Bellare et al. ............... 380/23 |
| 5,907,619 A * | 5/1999 | Davis ........................ 713/176 |
| 5,959,689 A | 9/1999 | De Lange et al. ........... 348/571 |
| 6,021,201 A | 2/2000 | Bakhle et al. ............... 380/25 |
| 6,028,939 A | 2/2000 | Yin ............................. 380/49 |
| 6,044,451 A | 3/2000 | Slavenburg et al. .......... 712/24 |
| 6,091,821 A | 7/2000 | Buer |
| 6,141,422 A | 10/2000 | Rimpo et al. ................ 380/44 |

2002/0001384 A1   1/2002   Buer et al. .................... 380/30

FOREIGN PATENT DOCUMENTS

| WO | WO 01/61912 A1 | 8/2001 |
|---|---|---|
| WO | WO 01/80483 A2 | 10/2001 |

OTHER PUBLICATIONS

Menezes,Oorschot, Vanstone(Handbook of Applied Cryptography, 1997 CRC Presss) pp. 332-335.*
Touch, J.D.: "Performance Analysis of MD5" Computer Communications Review, Association for Computing Machinery. New York, US, vol. 25, No. 4, Oct. 1, 1995, pp. 77-86.
Schneier B: "Secure Hash Algorithm (SHA)" Applied Cryptography. Protocols, Algoriths, and Source Code in C, New York, John Wiley & Sons, US, 1996, pp. 442-445.

(Continued)

*Primary Examiner*—Hosuk Song
(74) *Attorney, Agent, or Firm*—Ingrassia Fisher & Lorenz (57) ABSTRACT

A hash processing system and method for reducing the number of clock cycles required to implement the SHA1 and MD5 hash algorithms by using a common hash memory having multiple storage areas each coupled to one of two or more hash channels. The system further provides implicit padding on-the-fly as data is read from the common hash memory. The system shares register and other circuit resources for MD5 and SHA1 hash circuits that are implemented in each hash channel, and uses pipelined, two-channel SHA1 and pipelined, single-channel MD5 hash architectures to reduce the effective time required to implement the SHA1 and MD5 algorithms.

9 Claims, 5 Drawing Sheets

OTHER PUBLICATIONS

"Secure Hash Standard", *Federal Information Processing Standards Publication 180-1*, U.S. Department of Commerce Technology Administration National Institute of Standards and Technology,(Apr. 17, 1995), 1-21.

"VMS115; high-speed IPSec coprocessor", *Royal Phillips Electronics*, http://www.us6.semiconductors.com/pip/VMS115-1,(2001),2 pgs.

Anand, Satish.N. ,"Apparatus and Method for a Hash Processing System Using Multiple Hash Storage Areas", U.S. Appl. No. 10/144,195, (May 13, 2002),51 pgs.

Anand, Satish.N. ,et al. ,"Security Association Data Cache and Structure", U.S. Appl. No. 10/144,332, (May 13, 2002),49 pgs.

Anand, Satish.N. ,et al. ,"Single-Pass Cryptographic Processor and Method", U.S. Appl. No. 10/144,004, (May 13, 2002),49 pages.

Krawczyk, H..,et al. ,"HMAC: Keyed-Hashing for Message Authentication", http://www.cis.ohio-state.edu/cgi-bin/rcf/rcf2104.html, RCF 2104,(Feb. 1997),9 pgs.

Rivest, Ron.L. ,"The MD5 Message-Digest Algorithm", *MIT Laboratory for Computer Science and RSA Data Security, Inc.*, (Apr. 1, 1992),22 pgs.

Schneier, Bruce.,"One-Way Hash Functions", *In: Applied Cryptography: protocols, algorithms, and source code; Chapter 18*, (1996),429-459.

Takahashi, Richard.J. ,"Method and Apparatus for Creating a Message Digest Using a One-Way Hash Algorithm", U.S. Appl. No. 09/880,700, (Jun. 13, 2001),26 pgs.

Takahashi, Richard.J. ,"Method and Apparatus for Creating a Message Digest Using a One-Way Hash Algorithm", U.S. Appl. No. 09/880,699, (Jun. 13, 2001),35 pgs.

* cited by examiner

APPARATUS AND METHOD FOR A HASH PROCESSING SYSTEM USING INTEGRATED MESSAGE DIGEST AND SECURE HASH ARCHITECTURES

RELATED APPLICATIONS

This application is a non-provisional application claiming benefit under 35 U.S.C. sec. 119(e) of U.S. Provisional Application Ser. No. 60/297,876, filed Jun. 13, 2001 (titled APPARATUS AND METHOD FOR A HASH PROCESSING SYSTEM USING MULTIPLE HASH STORAGE AREAS by Satish N. Anand) and of U.S. Provisional Application Ser. No. 60/340,013, filed Dec. 10, 2001 (titled APPARATUS AND METHOD FOR A HASH PROCESSING SYSTEM USING MULTIPLE HASH STORAGE AREAS by Satish N. Anand), which are each incorporated by reference herein.

BACKGROUND OF THE INVENTION

The present invention relates in general to security processing systems and, more specifically, to an apparatus and method for hash processing using multiple hash storage areas for reading and writing data during hash processing.

Hash functions have been widely used in modem cryptography to produce compressed data, message digests, fingerprints, and checksums, among other things. A hash function is a mathematical function that takes a variable-length input string, and converts it to a fixed-length output string. The output string is called a hash value, which typically is smaller than the input string. A "one-way" hash function is a hash function that works in one direction, meaning that it is easy to compute a hash value from an input string, but it is difficult to generate a second input string that hashes to the same value. Bruce Schneier, Applied Cryptography, at 429–59 (1996) includes a detailed discussion of various one-way hash algorithms.

In most modem security applications that implement hashing, the hash algorithms used are the SHA1 algorithm as defined in FIPS PUB 180-1, the MD5 algorithm as defined in RFC 1321, and HMAC-SHA1 and HMAC-MD5 as defined in RFC 2104, all of the foregoing which are incorporated by reference in full herein. These algorithms compute a signature or message digest of a sequence of bytes.

The MD5 and SHA1 hashing algorithms each require a temporary working memory of at least sixteen 32-bit words. The algorithms operate on an input data stream in blocks of 64 bytes. If the input data stream is not a multiple of 64 bytes, such as may occur when processing the last portion of data for a data packet, the algorithms define a procedure for implicit padding.

Typically, the temporary working memory is filled with 64-byte blocks of the input data stream. If the last block of input data for a data packet is less than 64 bytes, then the temporary working memory is filled with implicit padding as defined by the algorithms.

SHA1 Algorithm

As mentioned above, a commonly used, one-way hash algorithm is the "Secure Hash Algorithm," or "SHA1," which was developed by the National Institute of Standards and Technology (NIST) and the National Security Agency (NSA). SHA1 is described in detail in the Federal Information Processing Standards Publication 180-1 (May 11, 1993) (FIPS PUB 180-1), issued by NIST.

The federal government requires SHA1 to be used with their standardized "Digital Signature Algorithm" (DSA), which computes a signature for the message from a message digest. In addition, the federal government requires SHA1 to be used whenever a secure hash algorithm is required for a federal application, and encourages its use by private and commercial organizations. Accordingly, the use of SHA1 has become extremely common for applications that need a one-way hash algorithm.

When an input message of any length $<2^{64}$ bits is input into SHA1, the algorithm produces a 160-bit output called a "message digest." SHA1 sequentially processes message blocks of 512 bits when computing a message digest. If a message is not a multiple of 512 bits, then SHA1 first pads the message to make the message a multiple of 512 bits. The padded message is then processed by SHA1 as n 512-bit blocks, $M_1, \ldots, M_n$, where each block is composed of sixteen 32-bit words, $L_0, L_1, \ldots, L_{15}$.

The message digest computation uses two buffers, each consisting of five 32-bit registers, and a sequence of eighty 32-bit words. The registers of the first 5-word buffer are labeled ha, hb, hc, hd, and he, and the registers of the second 5-word buffer are labeled, h0, h1, h2, h3, h4. The words of the 80-word sequence are derived from the sixteen 32-bit words in the message block, and are labeled $W_0, W_1, \ldots, W_{79}$. A single word register, TEMP, is also employed.

One "round," t, is performed during each iteration of SHA1, where a round is defined as a calculation that operates on one word, $W_t$, of the 80-word sequence, referred to as the "input sequence." Accordingly, the processing of each block involves eighty iterations. Because each iteration takes one clock cycle, the processing of each block uses eighty clock cycles.

During the eighty iterations, SHA1 uses a sequence of eighty non-linear functions (NLF), $f_0, f_1, \ldots, f_{79}$. Each function, $f_t$, $0<=t<=79$, operates on three 32-bit words, and produces a 32-bit word as output. SHA1 also uses a sequence of constant words, $K_0, \ldots, K_{79}$, during the eighty iterations. $f_t$ (X, Y, Z) is defined as follows:

$f_t$(X,Y,Z)=(X AND Y) OR ((NOT X) AND Z) (0<=t<=19)
$f_t$(X,Y,Z)=X XOR Y XOR Z (20<=t<=39)
$f_t$(X,Y,Z)=(X AND Y) OR (X AND Z) OR (Y AND Z) (40<=t<=59)
$f_t$(X,Y,Z)=X XOR Y XOR Z (60<=t<=79).

The algorithm also uses a sequence of constant words, $K_0, \ldots, K_{79}$. These constants are the same as the constants used in SHA1. In hex, these are given by:

$K_t$=5A827999 (0<=t<=19)
$K_t$=6ED9EBA1 (20<=t<=39)
$K_t$=8F1BBCDC (40<=t<=59)
$K_t$=CA62C1D6 (60<=t<=79)

To generate the message digest, first the h0, h1, h2, h3, h4 registers are initialized to a predetermined set of initialization values. Specifically, registers h0, h1, h2, h3, and h4 are initialized to the following values, in hex:

h0=67452301
h1=EFCDAB89
h2=98BADCFE
h3=10325476
h4=C3D2E1F0.

The creation of the message digest then involves the following operations, where each of the blocks, $M_1, M_2, \ldots, M_n$ are processed in order:

1) Divide $M_x$ into sixteen 32-bit words, $L_0, L_1, \ldots, L_{15}$, where $L_0$ is the left-most word, and $M_x$ is the next message block to be processed.
2) Let register ha=h0, hb=h1, hc=h2, hd=h3, and he=h4

3) For t=0 to 15, let $W_t = L_t$; and
For t=16 to 79, let $W_t = S^1(W_{t-3}$ XOR $W_{t-8}$ XOR $W_{t-14}$ XOR $W_{t-16})$, where $S^X$ indicates a left circular shift by X bits.
4) For t=0 to 79,
TEMP=$S^5$(ha)+$f_t$(hb,hc,hd)+he+$W_t$+$K_t$;
ha=TEMP; hb=ha; hc=$S^{30}$(hb); hd=hc; he=hd
5) Let h0=h0+ha; h1=h1+hb; h2=h2+hc; h3=h3+hd, h4=h4+he
Repeat steps 1–5 for the next block.

After processing the last block, Mn, the message digest is the 160-bit string represented by the five words h0, h1, h2, h3, h4.

In many cases, the SHA1 algorithm is performed within an application specific integrated circuit (ASIC), where the operations are performed using hardware-implemented logic gates. A hardware implementation of the SHA1 algorithm requires five registers for the 32-bit digest variables h0,h1, h2,h3,h4, which are initialized at start to constant values. It also uses registers for temporary cycle variables ha,hb,hc, hd,he, which have their initial value loaded from the five registers for h0,h1,h2,h3,h4 respectively. There are 80 rounds of hashing operation which changes the ha,hb,hc,hd, he register values. Finally, after 80 rounds, the h0,h1,h2,h3, h4 variables are incremented by ha,hb,hc,hd,he, respectively. In each round of SHA1 operation, the data is read from and written to the temporary working memory. Typically, in prior implementations, each hash operation over 64 bytes takes 80 clocks for each round of SHA1.

MD5 Algorithm

As mentioned above, a commonly used, one-way hash algorithm is "MD5", where MD stands for "message digest." MD5 was developed by Ron L. Rivest, and described in his paper entitled "The MD5 Message Digest Algorithm," RFC 1321 (April 1992).

When an arbitrarily large input message is input into MD5, the algorithm produces a 128-bit output called a "fingerprint" or "message digest" of the input message. MD5 sequentially processes message blocks of 512 bits when computing a message digest. If a message is not a multiple of 512 bits, then MD5 first pads the message to make the message a multiple of 512 bits. The padded message is then processed by MD5 as n 512-bit blocks, $M_1, \ldots, M_n$, where each block is composed of sixteen 32-bit sub-blocks, $W_j$, 0<=j<=15. The main loop of MD5 processes each 512-bit block one at a time, and continues for as many 512-bit blocks as are in the message. The output of the algorithm is a set of four 32-bit words, which concatenate to form a single 128-bit message digest. A four-word temporary buffer (ha, hb, hc, hd) is used to compute the message digest in four so-called rounds of computation, where each of ha, hb, hc, and hd is a 32-bit register. A four-word digest buffer (h0, h1, h2, h3) is used to accumulate the results from each round, and registers h0, h1, h2, and h3 are initialized to particular values as defined in the MD5 algorithm.

The main loop of MD5 has four "rounds," where each round includes sixteen operations. Accordingly, sixty-four operations, i (0<=i<=63), are performed for each message block.

During each operation, a non-linear function (NLF) is performed on three of four 32-bit variables stored in ha, hb, hc, and hd. Then, the operation adds the NLF output to the fourth variable, a sub-block, $M_j$, of the message, and a constant word, $t_i$. The operation then performs a left circular shift of a variable number of bits, $s_i$, and adds the result to the contents of one of ha, hb, hc or hd. Finally, that sum replaces the contents of one of ha, hb, hc or hd, and the next operation is performed. The NLF used for the operations in each round (i.e., each set of 16 sequential operations) is different from the NLF used in the previous round.

After the fourth round, ha, hb, hc, and hd are added to h0, h1, h2, and h3, respectively, and the main loop repeats for the next message block, until the last block, $M_n$, has been processed. After processing the last block, the message digest is the 128-bit string represented by the concatenated words stored in h0, h1, h2, and h3.

MD5 can be performed by software, or within an application specific integrated circuit (ASIC), where the operations are performed using hardware-implemented logic gates. During one operation, a non-linear function ($NLF_i$) is applied to three of the variables stored in registers ha, hb, hc, and hd. The three variables input into the NLF are the variables stored in hb, hc, and hd, although the input variables could differ for other rounds. The result is added, by a first full adder, to the contents of register ha. A second full adder adds the output of the first full adder to the appropriate sub-block, $W_j$, for the round and operation being performed. A third full adder then adds the output of the second full adder to the appropriate constant word, $t_i$, for the round and operation being performed.

A shifter then circularly left shifts the output of the third full adder by the appropriate number of bits, $s_i$, for the round and operation being performed. Finally, the contents of register hb is added, by a fourth full adder, to the output of the shifter. The output of the fourth full adder is then added to the contents of register hb, and that sum is placed in register ha, for use during the next operation. The next operation will then use a different message sub-block, $W_j$, constant word, $t_i$, and number of shifts, $s_i$, in the left circular shift operation, as well as a different set of three variables to be operated on by the NLF. In addition, the next operation may (or may not) use a different NLF.

During the four rounds associated with one message block, the logic blocks are cycled through sixty-four times. Further, the total number of cycles through the logic is 64n, where n is the number of 512-bit blocks in the message. Each cycle through the logic corresponds to one clock cycle. The clock frequency is limited by the various delays associated with the gates and other logical components. The logic depth of the operation is rather substantial, because the logic includes computationally complex full adders, among other elements. The cumulative delay associated with this design is long, and consequently the clock frequency must be fairly low.

Now describing the MD5 algorithm in more detail and as mentioned above, the four-word digest buffer (h0, h1, h2, h3) is used to compute the message digest, where each of h0, h1, h2, and h3 is a 32-bit register. These registers are initialized to particular values, which are the same initialization values as are used in the standard MD5 implementation.

As described previously, the main loop of MD5 has four rounds, t (0<=t<=3), where each round includes sixteen operations. Accordingly, sixty-four operations, i (0<=i<=63), are performed for each message block.

During each operation, a non-linear function (NLF) is performed on three of four 32-bit variables stored in ha, hb, hc, and hd. Then, the operation adds the NLF output to the fourth variable, a sub-block, $M_j$, of the message, and a constant word, $t_i$. The operation then performs a left circular shift of a variable number of bits, $s_i$, and adds the result to the contents of one of ha, hb, hc or hd. Finally, that sum replaces the contents of hb. The other registers are updated as ha=hd; hd=hc; hc=hb; and hb=sum.

The NLF used for the operations in each round (i.e., each set of 16 sequential operations) is different from the NLF used in the previous round. Each NLF takes as input three 32-bit words and produces as output one 32-bit word. The four NLFs are defined as follows, and are the same as the NLFs used in the standard MD5 implementation:

F(X,Y,Z)=(X AND Y) OR ((NOT X) AND Z) (for round 1:0<=i<=15)

G(X,Y,Z)=(X AND Z) OR (Y AND (NOT Z)) (for round 2:16<=i<=31)

H(X,Y,Z)=X XOR Y XOR Z (for round 3:32<=i<=47)

I(X,Y,Z)=Y XOR (X OR (NOT Z)) (for round 4:48<=i<=63).

The main loop of the MD5 algorithm is performed as described below. First, the values in the four registers of the buffer (h0, h1, h2, h3) are copied into four 32-bit variables ha, hb, hc, and hd, so that ha=h0, hb=h1, hc=h2, and hd=h3.

Each of the four rounds is then performed by applying the following logic, which is the same logic as is used in the standard MD5 implementation. In the functions below, $W_j$ represents the jth sub-block of the message (0<=j<=15), <<<s represents a left circular shift of s bits, and "+" denotes the addition of words.

Round 1: For i=0 to 15,
FF(ha,hb,hc,hd,$W_j$,s,$t_i$) denotes the operation ha=hb+((ha+F(hb,hc,hd)+$W_j$+$t_i$)<<<s).

Round 2: For i=16 to 31,
GG(ha,hb,hc,hd,$W_j$,s,$t_i$) denotes the operation ha=hb+((ha+G(hb,hc,hd)+$W_j$+$t_i$)<<<s).

Round 3: For i=32 to 47,
HH(ha,hb,hc,hd,$W_j$,s,$t_i$) denotes the operation ha=hb+((ha+H(hb,hc,hd)+$W_j$+$t_i$)<<<s).

Round 4: For i=48 to 63,
II(ha,hb,hc,hd,$W_j$,s,$t_i$) denotes the operation ha=hb+((ha+I(hb,hc,hd)+$W_j$+$t_i$)<<<s).

During each round, the three variables operated upon by the NLF, the message sub-block, $W_j$, the constant word, $t_i$, and the number of shifts, $s_i$, in the left circular shift operation change from operation to operation. For each round and operation, these operations are performed sequentially, where the operations are the 64 operations as described in the standard MD5 implementation.

After Round 4, ha, hb, hc, and hd are added to the then current contents of h0, h1, h2, and h3, respectively. The main loop then repeats for the next message block, until the last block, $M_n$, has been processed. After processing the last block, the message digest is the 128-bit string represented by the concatenated words stored in h0, h1, h2, and h3.

As mentioned above, the MD5 algorithm requires four 32-bit digest variables h0,h1,h2,h3, which are initialized at start to constant values. It also uses temporary cycle variables ha,hb,hc,hd, which load their initial value from h0,h1,h2,h3 respectively. There are 64 rounds of hashing operation, which changes the ha,hb,hc,hd values during processing. Finally, after 64 rounds, the h0,h1,h2,h3 variables are incremented by ha,hb,hc,hd respectively. In each round of MD5 operation, only read operations are performed on the temporary working memory. Typically, each hash operation over 64 bytes takes 64 clocks for each round of MD5.

Temporary Working Memory Usage

Typically, for each hash operation over 64 bytes, including the SHA1 or MD5 operations described above, the hash blocks are idle while the temporary working memory is filled again with the next 64 bytes of input data. This filling operation may typically take 16 clocks to write 16 words of 32-bit data. These idle cycles reduce the ideal bandwidth of a hash circuit or block. It would be desirable to have a hash block that substantially eliminates this loss of ideal bandwidth. Since the hash operation takes several clock cycles to complete, generally the next 64 bytes of input data stream is accumulated in a buffer to load to the temporary working memory as soon as the hash operation is complete.

In standard IPSec and SSL/TLS applications, both encryption and hashing operations are performed. For shorter data packets, the hashing operations typically require an order of magnitude greater number of clock cycles than the corresponding ciphering operations. If several hash blocks are used for the same ciphering channel, then more buffering and working memory resources are required for the hashing operations because of the use of separate buffers and working memory. It would be desirable to have a hash block that implements two (or more) hash channels for each ciphering channel while reducing the size of the required buffering and working memory resources.

Implicit Padding

As mentioned above, implicit padding is defined for both the SHA1 and MD5 algorithms. Prior hash circuits typically perform this padding after a block of data has been loaded into the temporary working memory. This padding adds additional clock cycles of processing time for each 64-byte block of data to be hashed. It would be desirable to avoid the idle clock cycles required for loading the temporary working memory with padding bytes so that bandwidth through the hash block could be increased.

Need for Improved Hash Processing System

As the desire to compute data increases, communication systems increasingly place more demands on the computation speed of cryptographic algorithms. Thus, there is a need for an improved hash processing system that handles SHA1 and MD5 hash operations in fewer effective clock cycles, that makes improved usage of buffering and working memory resources, and that reduces the time dedicated to performing padding prior to hashing of data.

DETAILED DESCRIPTION OF THE DRAWINGS

The present invention generally provides an improved hash processing system and method for reducing the number of clock cycles required to implement the SHA1 and MD5 hash algorithms by using a common hash memory having multiple storage areas each coupled to one of two or more hash channels. The present invention further provides padding that is done as data is read from the common hash memory, rather than requiring padding of the hash memory prior to beginning hash operations. Moreover, the present invention shares register and other circuit resources for MD5 and SHA1 hash circuits that are implemented in each hash channel, and uses pipelined, two-channel SHA1 and pipelined, single-channel MD5 hash architectures to reduce the effective time required to implement the SHA1 and MD5 algorithms compared to prior implementations. It should be noted that as used herein the term "register" is intended to include both registers and other types of data storage elements that may be alternatively used in the hash processing system and method described below, such as, for example, portions of random access memory (RAM).

Figure 1:
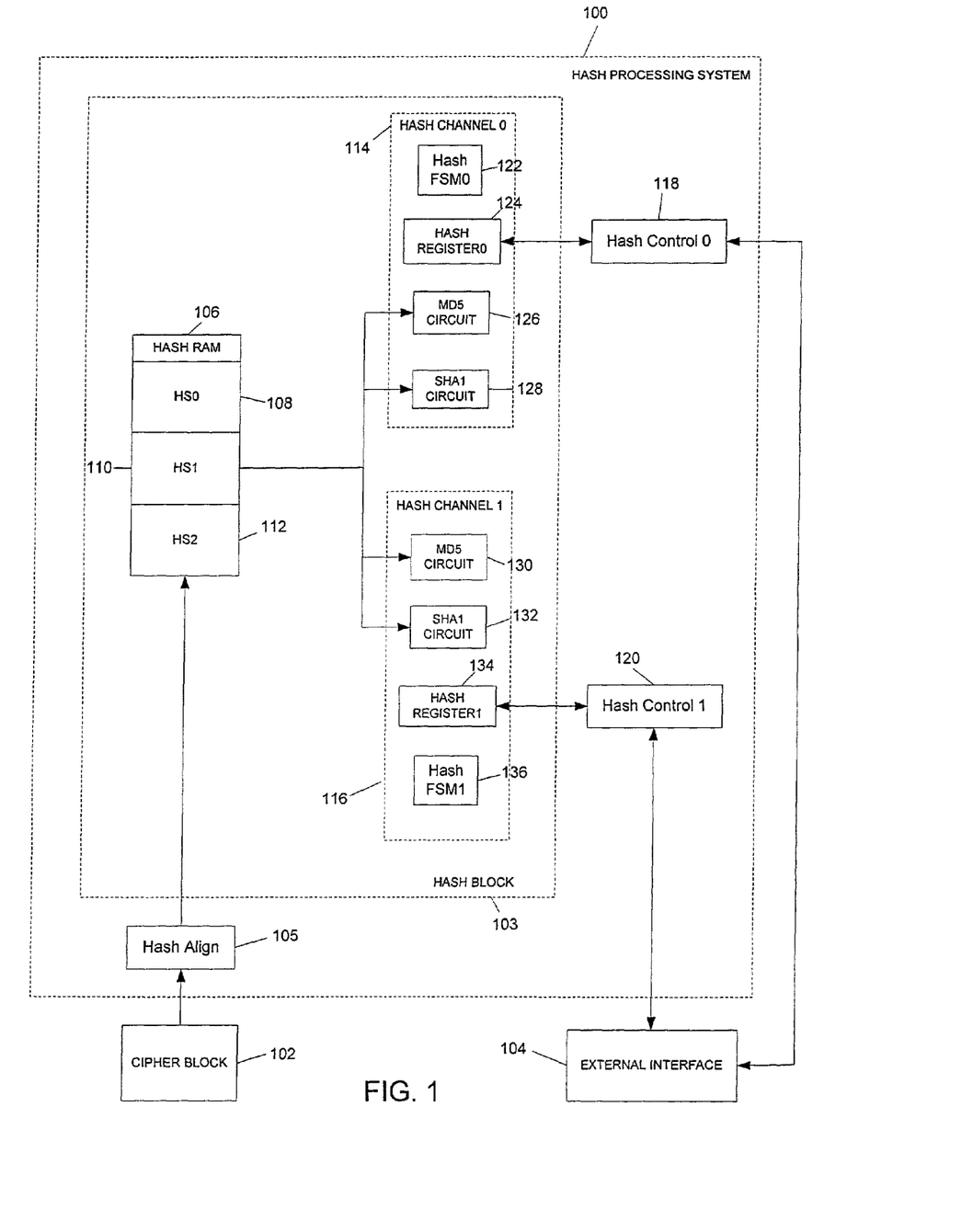
FIG. 1 is a block diagram of a system-level architecture of a hash processing system according to an embodiment of the present invention.

FIG. 1 is a block diagram of a system-level architecture of a hash processing system 100 according to an embodiment of to the present invention. System 100 accepts data, for example, from a cipher block 102 for hash processing (the term "block" as used herein generally refers to a circuit). System 100 may also receive data for hashing from other sources. The data is aligned using standard alignment techniques in a hash align block 105 and then provided for hash processing by a hash block 103. System 100 includes hash controllers 118 and 120, indicated as Hash Control 0 and Hash Control 1, which are coupled to an external interface 104 to provide initial pre-calculated hash digests and to store final hash digests, and to accept control information such as the type of hash to be performed including, for example, MD5, SHA1, HMAC-MD5, HMAC-SHA1, PRF, etc. Controllers 118 and 120 also initiate hash operations for a given data packet in the corresponding one of hash channels 114 or 116. Once hashing of a data packet has begun in one of hash channels 114 or 116, that same channel will be used to complete hashing of the entire data packet.

Hash block 103 comprises a common hash memory 106 having multiple storage areas. Hash memory 106 is, for example, a random access memory (RAM). In the specific embodiment illustrated, there are, for example, three storage areas 108, 110 and 112, indicated as HS0, HS1, and HS2. Hash block 103 further comprises multiple hash channels. In the specific embodiment illustrated, there are, for example, two hash channels 114 and 116, indicated as Hash Channel 0 and Hash Channel 1. In other embodiments of the present invention, there could be more than three storage areas and more than two hash channels.

Hash channel 114 comprises a hash finite state machine (FSM) 122 (indicated as Hash FSM0), a hash register 124 (indicated as Hash Register0), MD5 circuit 126, which implements the standard MD5 algorithm, and SHA1 circuit 128, which implements the standard SHA1 algorithm. FSM 122 controls the sequencing of the selected hash operation in hash channel 114. According to the present invention, circuits 126 and 128 can be implemented using standard MD5 and SHA1 architectures, or may be implemented using the specific architectures as described herein. According to the present invention, circuits 126 and 128 share certain circuit resources, such as for example multiplexers and registers, as described in more detail below. Hash channel 116 comprises a hash FSM 136, a hash register 134 (indicated as Hash Register1), MD5 circuit 130, and SHA1 circuit 132, all of which are substantially identical in structure and operation to hash channel 114.

During operation, Hash Control 0 and Hash Control 1 controllers 118 and 120 load initial values used in the SHA1 or MD5 algorithms into Hash Register0 and Hash Register1 registers 124 and 134, respectively, and control information such as, for example, the type of hash operation and padding requirements into control registers (not shown) in hash channels 114 and 116.

Each storage area 108, 110, and 112 has a size of, for example, 64 bytes. Data from hash align block 105 generally fills each storage area sequentially in a "round-robin" manner starting with one of the storage areas such as, for example, HS0, and continuing to fill HS1, then HS2, then HS0 again as data is received.

During operation, when one of hash channels 114 or 116 is free, then it will accept data from one of storage areas HS0, HS1, or HS2. During hashing, intermediate hash computational results are accumulated in hash registers 124 and 134. A hash channel continues to accept data from hash memory 106 until all data for a given data packet has been processed through either hash channel 114 or 116. Then, hash controller 118 or 120, as appropriate, reads the final digest from hash register 124 or 134 and provides it to external interface 104, for example, for verification of incoming data packets or to append a MAC to outbound data packets, or for other purposes by external cryptographic processing circuitry (not shown) on the same chip or otherwise.

Registers 124 and 134 generally store values used in hash processing. For example, certain hash algorithms, such as HMAC pre-processing and the pseudo-random function (PRF) involve the calculation of inner and outer digest values, which are re-used during hash processing. The inner and outer digest values are stored in registers 124 and 134. Also, as each, for example, 64-byte block of data is hashed, registers 124 and 134 accumulate the results from each 64-byte block until the full packet is processed.

Each of hash storage areas HS0, HS1, and HS2 are shared by Hash Channels 0 and 1. Hash memory 106 receives cipher data from cipher block 102. The cipher data is written to one of the hash storage areas, for example HS0, until it is full. Then, later cipher data fills a next storage area, for example HS1. Next, storage area HS2 is filled, then the foregoing pattern continues to rotate through HS0, HS1, and HS2 during operation. Prior to writing data to hash memory 106, hash alignment circuitry (not shown) in hash align block 105 aligns the data from cipher block 102.

When each storage area of hash memory 106 is full (or the end of a packet is determined by a byte count passed to hash block 103 in a control signal from an external controller (not shown) through external interface 104 as determined, for example, by the hash starting address offset and hash length in bytes for the packet), its contents is read into hash channel 114 or 116 for hashing. The resulting digest is sent, for example, to the external controller.

Even more specifically, Hash Channel 0 and Hash Channel 1 each perform processing on, for example, 64-byte blocks of data corresponding to a single data packet. A first external FSM (not shown) controls packet processing for a first data packet and is coupled to control Hash Channel 0 to perform hashing for the first data packet. If data for a second packet fills one of the storage areas of hash memory 106, then hashing of the second packet will be controlled by a second external FSM (not shown) and the data sent from hash memory 106 to Hash Channel 1 for processing. If Hash Channel 1 is also busy, then the data for the second packet will wait in hash memory 106 until one of hash channels 114 or 116 is free. Thus, in general, hash block 103 begins hashing the next packet of data when one of hash channels 114 and 116 is free.

Also, it should be noted that hash block 103 typically uses the hash channels 114 and 116 in an alternating, or pingpong, manner with each successive data packet, for example, in a single IPSec data channel using the opposite hash channel of the prior packet. However, if both hash channels 114 and 116 are free when data for a new packet is stored in hash memory 106, then hash processing arbitrarily defaults, for example, to Hash Channel 0. Thus, in light of the foregoing discussion and according to the present invention, hash block 103 is able to hash a first data packet and a second data packet, which are in the same independent IPSec data channel pipeline, simultaneously.

For some security protocols, a 64-byte block of data will be read from one of the storage areas in hash memory 106 more than one time to do repeated hash operations in one of hash channels 114 or 116. For example, TLS or IPSec requires an HMAC operation depending on the byte count of the packet. There also may be both a padding and an HMAC cycle. Thus, for example, a block of data may be read from hash memory area HS1 three times successively and sent to Hash Channel 1 to calculate a digest.

When the security protocol to be implemented is, for example, the TLS pseudo-random function (PRF) mode, then hash channels 114 and 116 work in tandem to perform MD5 and SHA1 processing for the first data packet simultaneously. By such tandem operation, hash processing time may be cut roughly in half. During such PRF computations, data may be read from one hash storage area, for example HS0, and written back to another hash storage area, for example HS2. Then, after the first 16 rounds of computation for, for example, SHA1 computations, all reading and writing can be done solely from area HS2. Also, for PRF computations of up to 128 bytes, data may be read from both areas HS0 and HS1.

Hash channels 114 and 116 also may work in tandem to do HMAC pre-processing for a data packet. The inner and outer digests calculated from HMAC pre-processing may be saved, for example, in registers 124 or 134, the contents of which may be then saved to an external data cache (not shown) through external interface 104 by the external controller (not shown) mentioned above for later use in doing HMAC processing as appropriate for a given data packet. The pre-calculated digests are multiplexed with data as read from hash memory 106 for hash processing as described in more detail below. The foregoing pre-processing step saves two hash cycles every 64 bytes of data and must be done for every data packet as called for in the IPSec and TLS 1.0 modes. The saved digests are restored to register 124 or 134 by the external controller, during processing of a data packet in IPSec and TLS 1.0 modes, at the start of hashing another data packet. When hashing is complete for a data packet, a hashing complete signal is sent by hash block 103 to the external controller, which then reads the final calculated digest for the packet through external interface 104 from registers 124 or 134.

Figure 2:
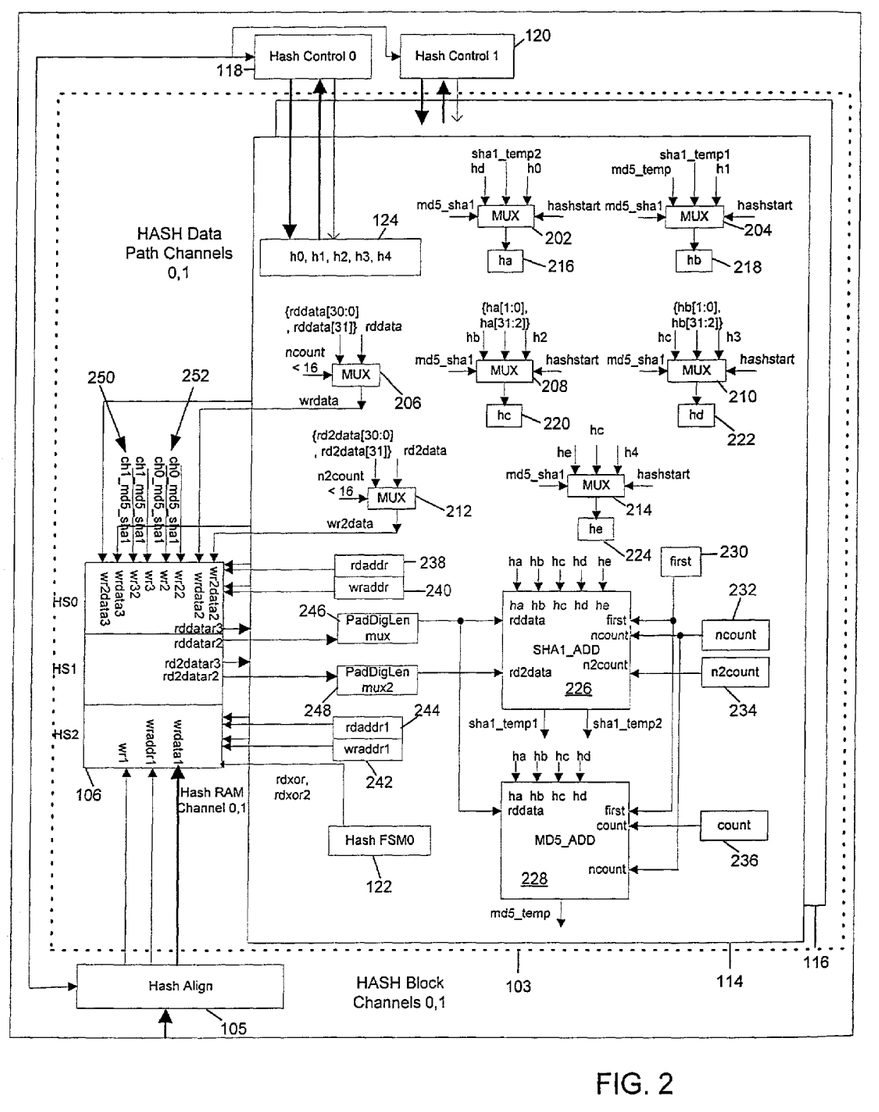
FIG. 2 is a detailed block diagram of a hash block, according to an embodiment of the present invention, in the hash processing system of FIG. 1.

FIG. 2 is a more detailed block diagram of an embodiment of hash block 103. In the figures provided herein, common reference numbers are used for common elements. FIG. 2 substantially illustrates only hash channel 114 for simplicity of illustration. The following discussion of structure and operation will also substantially apply to hash channel 116.

It should be noted that, according to the present invention, hash channels 114 and 116 share common hash memory 106. Each hash channel has independent read and write data paths to and read/write addressing of hash memory 106. Data is written to hash memory 106 from input align block 105 on data bus wrdata1. A write control signal wr1 is used during writing to write to the location pointed to by address wraddr1. The wraddr1 address also includes the selection of one of storage areas HS0, HS1 or HS2.

Hash block 103 comprises several multiplexers (indicated generally as "MUX") 202–214 and temporary registers 216–224 (corresponding to temporary variables ha, hb, hc, hd and he) that are shared, under the control of Hash FSM 122, by MD5 circuit 126 and SHA1 circuit 128 (see FIG. 1). MD5 circuit 126 comprises a four-input MD5 adder 228, and SHA1 circuit 128 comprises a five-input SHA1 adder 226.

Counter registers 230–236 (indicated as first, ncount, n2count, and count) are coupled to adders 226 and 228. Read address registers 238 and 244 and write address registers 240 and 242 are coupled to read and write data to and from hash memory 106, which is, for example, memory-mapped to provide each storage area HS0, HS1, and HS2. Two sets of read and write address registers are provided to support two-rounds-per-cycle SHA1 processing according to the present invention as described in more detail below.

Padding circuits 246 and 248 are coupled to provide, according to the present invention, padding as required for data read from hash memory 106. Padding is done substantially as the data is being read from hash memory 106 (sometimes referred to herein as padding "on-the-fly") and provided to one of adders 226 or 228 during hashing. The padding bytes used, for example of values 0×80 or 0×00, depends on the size of the input data (as reduced by a modulus 64 operation) and the current address that is being read. The padding bytes and the final length bytes are inserted on-the-fly so they are, for example, in compliance with the requirements of the MD5 and SHA1 algorithms. Padding circuits 246 and 248 also have the ability to insert inner digests of hashes calculated previously, which are required for final hash rounds of the HMAC-MD5 and HMAC-SHA1 algorithms. Padding circuits 246 and 248 further have the ability to prepend digests calculated previously to data in the hash memory 106, as required in some algorithms such as PRF.

As mentioned above, during execution of the SHA1 algorithm, write operations are performed on hash memory 106. Write enable signals 250 (indicated as ch1_md5$_{13}$_sha1) and 252 (indicated as ch0_md5_sha1) permit writing to hash memory 106 when using SHA1. Signals 252 are used by Hash Channel 0, and writing is enabled when ch0_md5_sha1 is high. Signals 250 are used by Hash Channel 1. Multiplexers 206 and 212 are used during SHA1 write operations, as described in more detail below.

Now describing hash block 103 in more detail, hash block 103 supports, for example, two hash channels 114 and 116 which can operate independently to perform hash operations such as MD5, SHA1, HMAC-MD5, HMAC-SHA1 or can operate in tandem to perform hash operations such as pre-process HMAC or Pseudo Random Function (PRF) as defined in the Transport Layer Security (TLS) 1.0 specification.

There are three hash sets of temporary working memory corresponding to hash memory storage areas HS0, HS1, and HS2, as described above. As mentioned above, hash align block 105 writes data to the storage areas in a round-robin manner. For example, if Hash Channel 0 is already working on data from area HS0, hash align block 105 writes the next 64 bytes to area HS1, then another subsequent 64 bytes to area HS2. The three hash storage areas are used to act as a FIFO buffer for hash align block 105 and also to provide three hash sets of temporary working memory that are shared by hash channels 114 and 116.

In contrast to the present invention, prior systems have required a separate FIFO buffer, which is typically connected in series with the hash operating memory, for receiving incoming data. The system according to the present invention reduces delays associated with the use of such separate buffers and does not require a separate buffer for each channel as in prior systems, thus reducing chip area. Further, the sharing of hash temporary working memory 106 by two or more hash channels according to the present invention saves buffering resources. It also enables two or more hash channels to each operate on the same data as required in some hash operations such as PRF, HMAC pre-processing, which call for both SHA1 and MD5 hashing. In such a case, one of the hash channels, for example, operates on the data using an MD5 hash, and another channel operates on the same data using a SHA1 hash.

Hash controllers 118 and 120 control the start and completion of operations in hash channels 114 and 116, and also sequence through the padding hash state, HMAC hash state, PRF hash states, and HMAC pre-process hash states as appropriate for the data packet being processed by its corresponding hash channel. Hash controllers 118 and 120 also restore the pre-computed HMAC standard inner digest or outer digest values to digest register 124 (which includes individual registers for values h0, h1, h2, h3, and h4) before starting a new hash, and further control the reading of the final message digest from the h0, h1, h2, h3, and h4 registers.

Hash Data Path for SHA1 Algorithm

Figure 3:
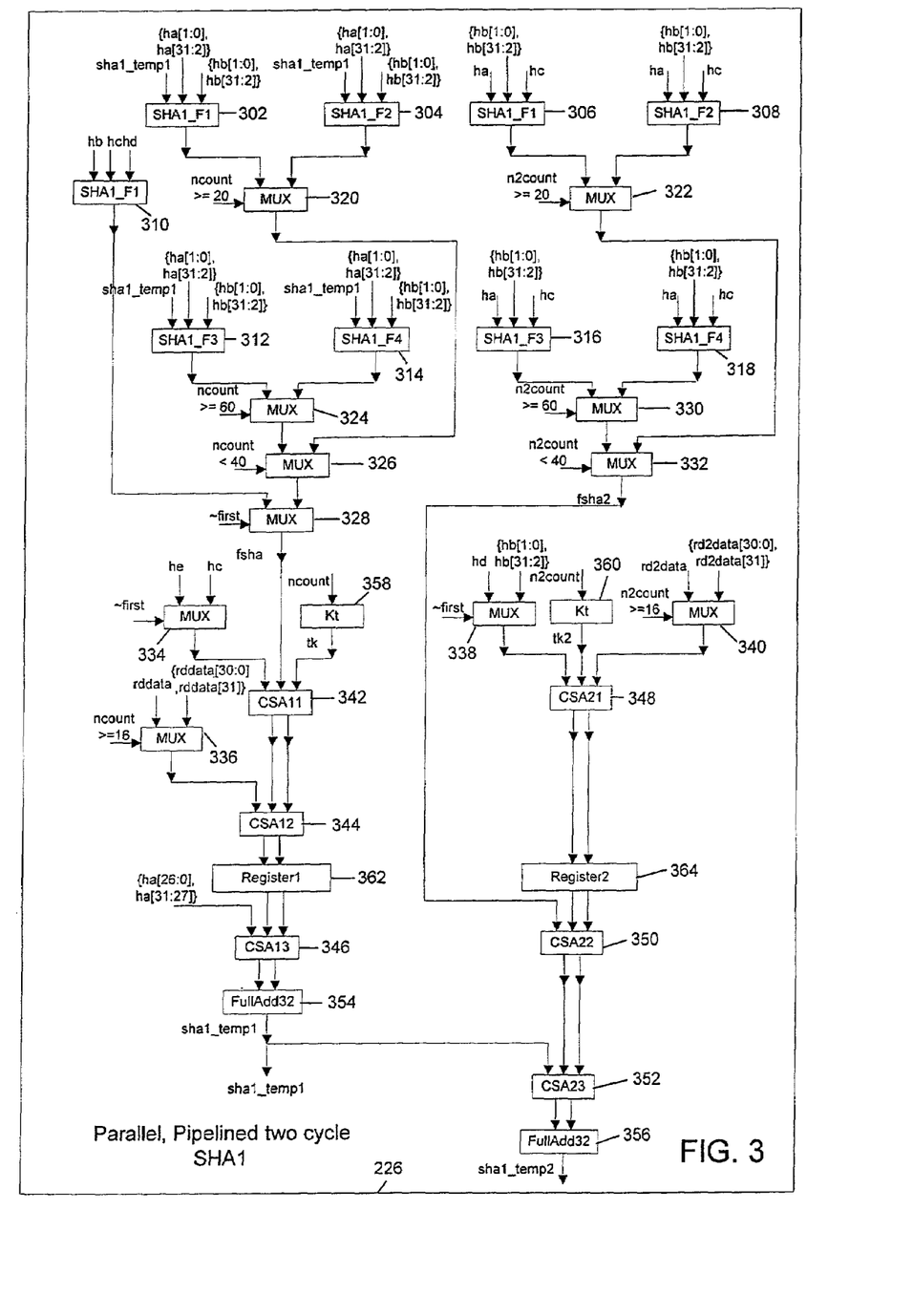
FIG. 3 is a detailed block diagram of a SHA1 adder, according to an embodiment of the present invention, in the hash block of FIG. 2.

SHA1 circuit 128, as discussed later below for FIG. 3, is implemented as a pipelined, parallel two-rounds-per clock cycle architecture. There are two read accesses from storage area HS0 (or HS1 or HS2, as may be applicable for the current hash operation) and two write accesses to the same storage area HS0 (or HS1 or HS2) every clock cycle, corresponding to the two rounds of SHA1 computation. Registers 238 and 240 (signals rdaddr, wraddr) control the read and write addresses for one round of hash in the current clock cycle. Registers 242 and 244 (signals rdaddr1, wraddr1) control the read and write addresses for the second round of hash in the same clock cycle.

The read data from hash memory 106 (data busses rddatar2, rd2datar2) are modified by padding circuits 246 and 248 (indicated as "PadDigLen" mux and mux2) to provide padded input hash data rddata and rd2data for use by SHA1 adder 226 during the current two rounds of hash. Padding circuits 246 and 248 automatically implement implicit padding on-the-fly based on the input data stream length. More specifically, each of padding circuits 246 and 248 multiplexes the padding bytes 0x80 or 0x00, input data stream length in bits as required by MD5 and SHA1 algorithms, and/or stored inner digest in HMAC operations, all depending on the hash command and input data stream length.

To implement padding on-the-fly as described above, padding circuits 246 and 248 each comprise standard multiplexing circuits (not shown) to select the appropriate padding bytes, stream length, or previously-calculated digest for insertion into a portion or all of the bit positions, as appropriate for the particular input data size, for each 32-bit word read from the hash storage areas. Previously-calculated digests are re-loaded into registers and then multiplexed with the words read from the hash storage area.

Hash block 103 receives and stores an input data stream length provided, for example, from hash align block 105 for use in the multiplexing of padding and/or other bytes by padding circuits 246 and 248. Padding on-the-fly enables hash block 103 to achieve a more ideal bandwidth, and avoids the idle clocks required by prior hash circuits in loading the temporary working memory with padding bytes. Prior systems first write the input data to an operating memory, check the length of the input data, and then add padding to the operating memory. In contrast, the present invention permits the start of hashing once all of the input data is written to the operating memory, without the need to wait while padding bytes are also written to the operating memory.

Hash FSM0 state machine 122 controls the sequencing through the rounds of the hash. The hash operation for 64 bytes is completed in 41 clock cycles. The 80 rounds of SHA1 are completed in 40 clock cycles (i.e., two rounds per clock cycle), and the last clock cycle is used for the incrementing the h0, h1, h2, h3, and h4 registers in register 124 by the values of ha, hb, hc, hd, and he in registers 216–224, respectively.

The ha, hb, hc, hd, and he registers 216–224 are loaded with initial values from the h0, h1, h2, h3, and h4 registers when signal hashstart is active. As illustrated in FIG. 2, all muxes (indicated by "MUX") are illustrated to follow a consistent pattern as described below. First, if signal hashstart is active or logic one, then the three-input multiplexers ("muxes") load the ha, hb, hc, hd, and he registers with the value corresponding to the third input as shown on the right-hand side of the mux (as illustrated in FIG. 2). For example, for mux 204, value h1 is loaded to hb register 218.

If signal hashstart is inactive or logic zero, then one of the first two inputs (on the left-hand side of each mux as illustrated in FIG. 2) is selected. If a SHA1 hash is selected (i.e., signal md5_sha1 is active or logic one), then the middle input (e.g., sha1_temp1 for mux 204) is selected. If an MD5 hash is selected (i.e., signal md5_sha1 is inactive or logic zero), then the first input md5_temp for mux 204 is selected. The ha, hb, hc, hd, and he hash registers; the count registers 230–236 (i.e., signals ncount (corresponding to next count), n2count (corresponding to next next count), and first (which indicates the first cycle of a hash)); and the read data rddata and rd2data are coupled to provide inputs to SHA1 adder 226 (which is described in more detail below).

As mentioned above, during execution of the SHA1 algorithm, write operations are performed on hash memory 106. Two such write operations are done for each clock cycle, corresponding to the parallel two-round-per-clock-cycle implementation of the present invention. Multiplexers 206 and 212 are used to select the appropriate data for writing to comply with the standard SHA1 algorithm. If selection input signal {ncount<16} is false or zero, then the left-hand input is used. If {ncount<16} is true, then the right-hand input is selected. The lower four bits of the write address as indicated by wraddr and wraddr1 may be the same address as the read addresses rdaddr and rdaddr1, and the upper two bits (which indicate the area HS0, HS1, or HS2) may be the same or different. Normally, the writes and reads use the same hash storage area, but for PRF and HMAC pre-processing commands where both hash channels 114 and 116 operate on the same data, for example stored in area HS0 and HS1, the first hash channel 114 (executing SHA1) may read data from either area HS0 or HS1 and use HS2 for writing; the other hash channel 116 (executing MD5) may read data from either area HS0 or HS1.

According to the present invention, in general the rdaddr and wraddr addresses are used to read and write to even locations 0, 2, 4, . . . , when performing the SHA1 algorithm. The rdaddr1 and wraddr1 addresses are used to read and write to odd locations 1, 3, 5, . . . . To accomplish this, the lower address bit in each of addresses rdaddr[0] and wraddr

[0] is forced to zero, and the lower address bit in each of addresses rdaddr1[0] and wraddr1[0] is forced to one.

The rdxor and rdxor2 signals from the Hash FSM0 state machine 122 for the first and second rounds respectively for the SHA1 algorithm indicate the type of read access to hash memory 106. These signals are active only for the SHA1 algorithm during rounds 17 through 80. They are inactive for the MD5 algorithm. For rounds 17 through 80, four words are read in a single access operation from a hash storage area (similarly as described above) and then exclusively-OR'ed and shifted, as described below, to provide a word $W_t$ (17<=t<=80) for processing as defined by the standard SHA1 algorithm.

The upper two bits of the read addresses in rdaddr and rdaddr1 indicate the hash storage area. The lower four bits of the read addresses indicate one of 16 locations of 32-bit words. If the rdxor (or rdxor2) signal is inactive, then one of 16 locations as indicated, for example, by the lower four bits of read address rdaddr[3:0] (or rdaddr1[3:0]) is returned.

If the rdxor signal is active, then for the first read indicated by rdaddr, four read accesses at locations rdaddr[3:0], (rdaddr[3:0]+2) modulo 16, (rdaddr[3:0]+8) modulo 16, and (rdaddr[3:0]+13) modulo 16 are done. Also, for the first three read accesses the least significant address bit is forced to zero since the first round of SHA1 accesses only even locations 0, 2, 4, etc. The fourth read access has the least significant address bit is forced to one. The data obtained from the four read accesses are XOR'ed (i.e., combined by XOR logical operations) and shifted and input to the padding circuit 246.

If the rdxor2 signal is active, then for the second read indicated by rdaddr1, four read accesses at locations rdaddr1 [3:0], (rdaddr1[3:0]+2) modulo 16, (rdaddr1[3:0]+8) modulo 16, and (rdaddr1[3:0]+13) modulo 16, are done. Also, for the first three read accesses the least significant address bit is forced to one since the second round of SHA1 accesses only odd locations 1, 3, 5, etc.

As part of pipelining the SHA1 architecture as described herein, a word sometimes must be read from a hash storage area location in a current clock cycle that is still being written to from a write operation started in a prior clock cycle; however, the read operation cannot read a valid word from the hash storage area since it still contains older data. According to the present invention, to implement pipelining, a stable value of the word being written is used to provide the word information for the read access. More specifically, for example, for the fourth read access the wrdata1 written in the previous cycle is used since the (rdaddr1[3:0]+13) modulo 16 location has older data which will be overwritten by wrdata1 in the current cycle. The data obtained from the four read accesses are XOR'ed and input to the padding circuit 248.

The read and write accesses of the two rounds of SHA1 being accessed as even and odd address locations according to the present invention as described above reduces the necessary read and write decode logic required for read/write accessing of the hash storage areas (HS0, HS1, HS2), thus saving gate area on chips incorporating hash processing system 100.

Hash Data Path for MD5 Algorithm

Figure 4:
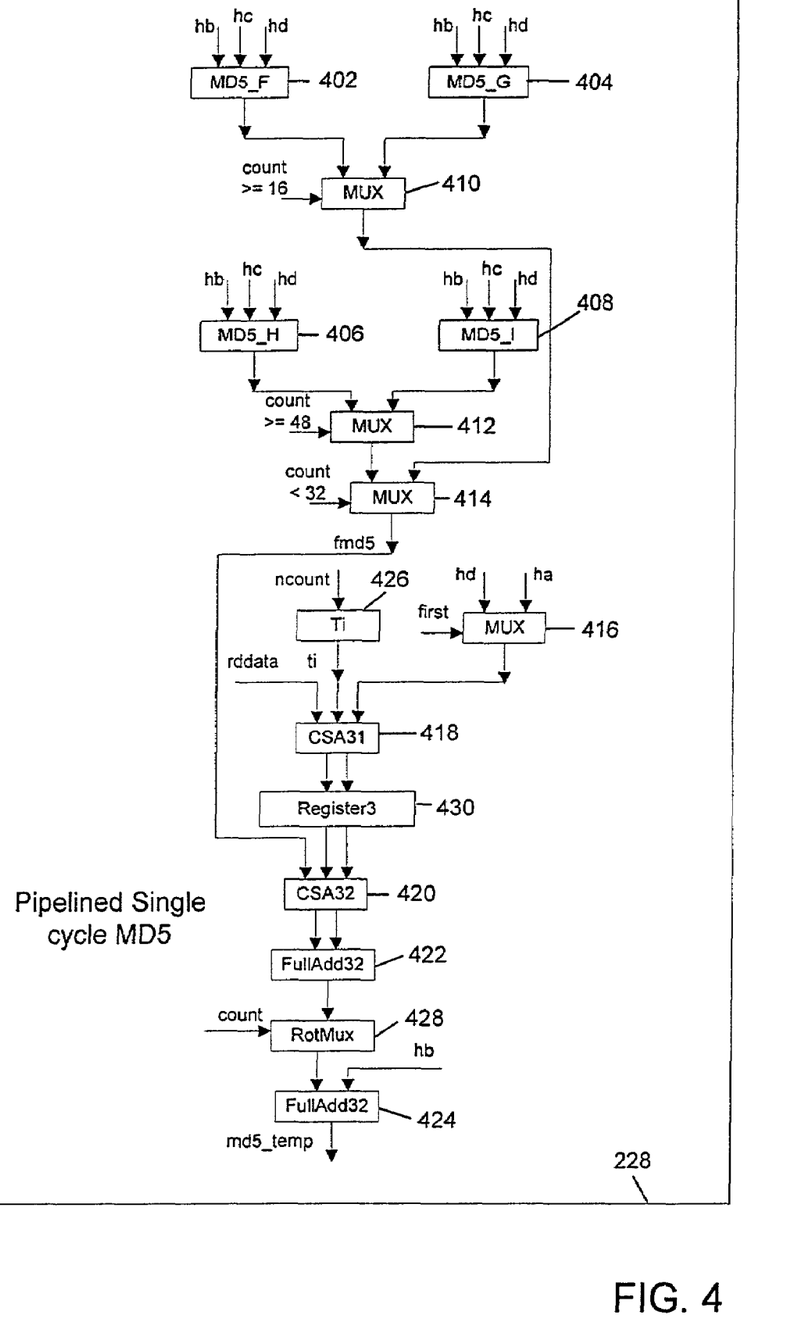
FIG. 4 is a detailed block diagram of an MD5 adder, according to an embodiment of the present invention, in the hash block of FIG. 2.

The MD5 algorithm, as discussed later below for FIG. 4, is implemented as a pipelined one-round-per clock cycle architecture. It uses only one read access to hash memory 106 during each clock cycle using address register 238 (signal rdaddr).

Read data rddatar2 is modified by padding circuit 246 to provide input data rddata for use by each single round of the MD5 hash. Padding circuit 246 automatically implements implicit padding on-the-fly substantially as described above for the SHA1 algorithm.

Hash FSM0 state machine 122 controls sequencing through the rounds of the MD5 hash. The hash operation for 64 bytes of data is completed in 65 clocks. The 64 rounds of MD5 are completed in 64 clocks, and the last clock is used to increment the h0, h1, h2, and h3 registers of register 124 by the values in ha, hb, hc, and hd registers 216–222, respectively. Registers h4 and he are not used for the MD5 hash.

The ha, hb, hc, and hd registers 216–224 are loaded with initial values from the h0, h1, h2, and h3 registers when signal hashstart is active. As discussed above, the three-input muxes 202–214 providing values to the ha, hb, hc, and hd registers 216–224 load the third input on the right-hand side (as illustrated in FIG. 2) if signal hashstart is active. If signal hashstart is inactive, one of the first two inputs on the left-hand side is selected. If the MD5 hash is the currently selected operation (i.e., signal md5_sha1 is inactive), then the first input is selected (e.g., for mux 204, md5_temp is selected). The hash registers ha, hb, hc, and hd; the count registers 230–236 (i.e., signals count, ncount (corresponding to next count), and first (which indicates the first cycle of a hash)); and the read data rddata are coupled to provide inputs to MD5 adder 228 (which is described in more detail below).

SHA1 Adder

FIG. 3 is a detailed block diagram of SHA1 adder 226 according to an embodiment of the present invention. Adder 226 comprises several logical function blocks 302–318, which implement the four standard SHA1 functions (indicated as SHA1_F1, SHA1_F2, SHA1_F3, and SHA1_F4). Each of blocks 302–318 has three input signals as shown. The shift notation indicated as [1:0] and [31:2] and similarly otherwise in the figures herein indicates the standard shift operations as defined in the SHA1 algorithm. This shifting can be accomplished, for example, by renaming signals without using gates.

Adder 226 also comprises several muxes 320–340, each of which has two inputs. It should be noted that the two-input muxes (indicated by "MUX") shown in FIGS. 3 and 4 use a common presentation definition in that the right-hand input (as shown in each figure) is selected when a select signal (e.g., ncount<40) to a mux is active or logic one. For example, for mux 334, if signal ~first is logic one, then hc is the input. If signal ~first is logic zero, then he is the input. It should also be noted that for mux 334, the tilde symbol in signal ~first indicates that this select signal is active low, so that in the first cycle, first is logic one and ~first is logic zero.

Adder 226 further comprises carry save adders 342–352 (indicated by prefix "CSA") and full adders 354 and 356, which are, for example, 32-bit adders. Function blocks 358 and 360 select the value of $K_t$ as defined in the standard SHA1 algorithm using the input ncount for block 358 and n2count for block 360. Registers 362 and 364 are used to latch intermediate values during execution of the SHA1 calculations to implement the pipelined structure illustrated in FIG. 3.

More specifically describing the operation of adder 226, for each SHA1 hash round, five input terms are provided to five-input adder 226. Adder 226 is implemented as a carry save adder (CSA) tree having, for example, three CSA adders and a full adder (indicated as "FullAdd32"), such as for example a 32-bit adder, for each round. The output of the first round is signal sha1_temp1 and the output of the second round is signal sha1_temp2. Both the rounds are computed substantially in parallel. Each round of the SHA1 is also pipelined. All inputs before registers 362 and 364 (Register1 and Register2) are fetched and computed a clock cycle earlier and latched. The outputs sha1_temp1 and sha1_temp2 are latched to the hb and ha registers, respectively.

The five input terms to adder 226 are described (for each of the first and second rounds) in more detail as follows:

1. First input: The read data rddata and rd2data are fetched a clock earlier and are each fed through a mux (reference number 336 or 340) and CSA stage (344 or 348) before latching by Register1 and Register2.
2. Second input: The fsha and fsha2 signals are the result of the selection of one of the non-linear SHA1 functions SHA1_F1, SHA1_F2, SHA1_F3 and SHA1_F4 for rounds 0 to 19, 20 to 39, 40 to 59 and 60 to 79, respectively. Since two rounds are being performed in parallel and also implemented in a pipelined access fashion, the inputs to the functions are hb,hc,hd for the first round in the first cycle and sha1_temp1, {ha[1:0], ha[31:2]}, and {hb[1:0],hb[31:2]} for the first round for later cycles (shown on the left side of FIG. 3). The inputs to the functions for the second round (shown on the right side of FIG. 3) are ha, {hb[1:0],hb[31:2]}, and hc. The fsha signal is computed a clock cycle earlier to the current clock cycle, and the fsha2 signal is computed in the current clock cycle.
3. Third input: The tk and tk2 signals result from the matching of the Kt function of the SHA1 hash to one of the standard constants K1, K2, K3, or K4 depending on the round count for t as 0 to 19, 20 to 39, 40 to 59 and 60 to 79, respectively. The tk and tk2 signals are computed a clock cycle earlier based on ncount for the first round and n2count for the second round.
4. Fourth input: The first round of SHA1 selects register he for the first clock cycle and register hc in the subsequent rounds. The second round of SHA1 selects register hd for the first cycle and {hb[1:0],hb[31:2]}, which notation as mentioned above is used herein to indicate standard shifting as defined for SHA1, for hashing in the subsequent rounds. These first and second round inputs are computed a clock cycle earlier.
5. Fifth input: The first round of SHA1 in each clock cycle uses {ha[26:0], ha[31:27]} as an input, and the second round of SHA1 in each clock cycle uses sha1_temp1 as an input. Each of these inputs is used in the current clock cycle.

The selection of the inputs in the present invention as described above enables a pipelined and parallel two-round-per-cycle SHA1 implementation, which increases the hash throughput. Further, the pipelined, parallel implementation according to the present invention as described above provides a critical path for the first round from Register1 (362) to signal sha1_temp1 to the SHA1 _F[1–4] functions, then back to Register1. The critical path for the second round is from registers to sha1_temp1 to sha1_temp2, ending at the ha register 216. Thus, the above SHA1 implementation reduces the critical paths compared to prior hardware implementations and increases the speed of the hash operations for each cycle, with two rounds implemented per cycle.

Also, according to the present invention, the storage areas HS0, HS1, and HS2 can differ for the read and write accesses done during the SHA1 hash. For example, a read access can be made to area HS0 or HS1 and the write access for the same round made to area HS2.

During the first 16 cycles of SHA1, one storage area, such as HS0 or HS1, may be used as the read set. According to the present invention, after the first 16 cycles, a different storage area, such as HS2, is used as a write set for both reading and writing during the hash. This enables hashing of the data in HS0 and HS1, for example, by an MD5 hash operation (as described below) occurring in parallel in another hash channel in hash block 103 without overwriting the data being used in the SHA1 hash.

In addition, repeated read and write operations can be made to the same storage area 108–112 by hash channel 114 or 116 to do repeated hashing. This aspect of the present invention is useful, for example, for Pseudo Random Function (PRF) generation in TLS 1.0 mode, where repeated hashing of input data is done in a sequence. This avoids loading the input data stream provided to system 100 repeatedly into hash memory 106 for each HMAC hashing round of the PRF generation.

MD5 Adder

FIG. 4 is a detailed block diagram of MD5 adder 228 according to an embodiment of the present invention. Specifically, adder 228 comprises logical function blocks 402–408 used to implement the standard MD5 functions (indicated as MD5_F, MD5_G, MD5_H, and MD5_I). Adder 228 also comprises muxes 410–416, which follow the selection convention for two-input muxes as described above for FIG. 3.

Adder 228 comprises carry save adders 418 and 420 and full adders 422 and 424, which are for example 32-bit adders. A functional block 426 selects the appropriate constant Ti (and provides as signal ti) per the standard MD5 algorithm depending on the input ncount. A multiplexer 428 implements the standard MD5 rotation based on the input signal count. For example, multiplexer 428 may be implemented as two four-input multiplexers connected in series or, alternatively, a shifter could be used. A register 430 (Register3) is used to latch intermediate values during execution of the MD5 calculations to implement the pipelined structure as illustrated in FIG. 4.

More specifically describing the operation of adder 228, each MD5 hash round has five input terms, for example, to a four-input adder and two-input adder. The four-input adder is implemented, for example, as a CSA tree having two CSA adders 418 and 420 and a 32-bit full adder 422. The output of the four-input adder is rotated by a constant depending on the round count by multiplexer 428 and the result provided as an input to two-input full adder 424, which is, for example, a 32-bit adder. The fifth input to adder 228 is fed to the other input of adder 424. The output of the round is signal md5_temp, which is the output of adder 424.

As mentioned above, each round of the MD5 is pipelined. All inputs before Register3 (430) are fetched and computed a clock cycle earlier and latched. The output md5_temp is latched to the hb register 218.

The five input terms to adder 228 are described in more detail as follows:

1. First input: The read data rddata is fetched a clock cycle earlier and is fed through the CSA31 stage 418 before latching by Register3 (430).
2. Second input: The fmd5 signal is the result of the selection of one of the non-linear MD5 functions MD5_F, MD5_G, MD5_H and MD5_I for rounds 0 to 15, 16 to 31, 32 to 47 and 48 to 63, respectively. The inputs to the functions are signals hb, hc, and hd. The fmd5 signal is computed in the current clock cycle.

3. Third input: The ti signal results from the selection of the Ti function of the standard MD5 hash to one of the constants, depending on the round count from 0 to 63. These are computed a clock cycle earlier based on ncount.
4. Fourth input: Mux 416 selects ha register 216 for the first clock cycle and hd register 222 for the subsequent rounds. This input is computed a clock cycle earlier.
5. Fifth input: This input is provided from the hb register 218.

The selection and addition of the first, third, and fourth inputs a clock cycle earlier and the latching to Register3 (430) reduces the critical path. Also, the present invention as described above enables a pipelined MD5 implementation, which increases the hash throughput. In addition, the pipelined implementation provides a critical path for a round as being from the hc, hb and hd registers 218–222 to the MD5_F [or G or H or I, as applicable] function blocks, 402–408 to CSA32 adder 420, to FullAdd32 adder 422, to RotMux multiplexer 428, to FullAdd32 adder 424 and then back to the hb register 218. This implementation according to the present invention minimizes the critical path and increases the speed of the hash computation. Further, CSA31 adder 418 is not in the critical path.

The hash data for the MD5 hash may be read from one of areas HS0, HS1 or HS2. Similarly as described above, the MD5 hash may use, for example, area HS0 or HS1 for hashing while the SHA1 adder 226 in another hash channel uses area HS0 or HS1 for reading and area HS2 for writing. This feature is useful, for example, for Pseudo Random Function generation in TLS 1.0 mode where repeated hashing of input data is done in a sequence.

Hash Channels and Use of Common Hash Memory

Figure 5:
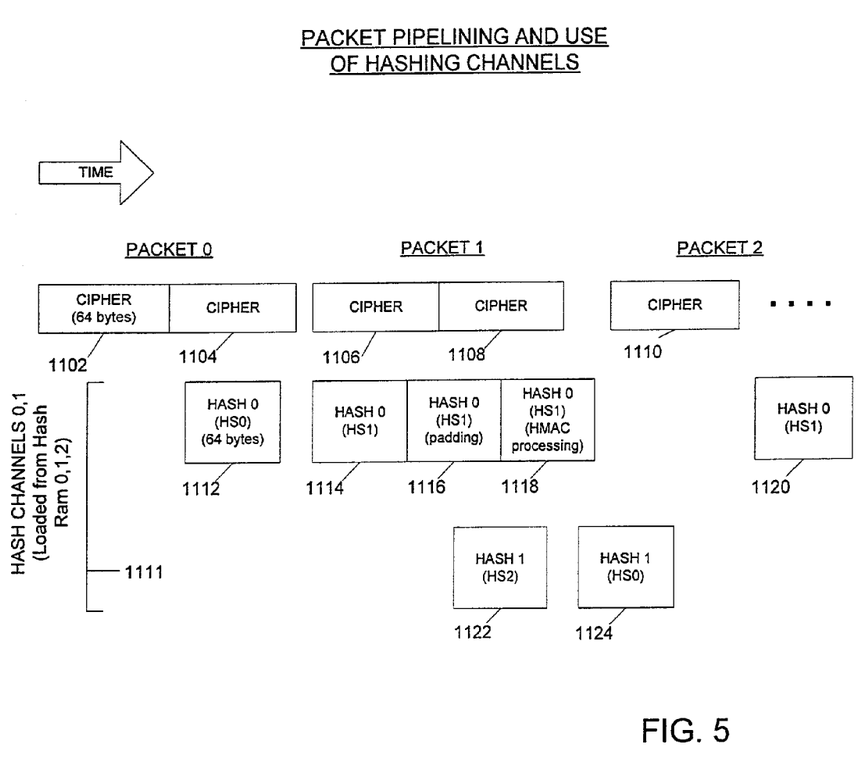
FIG. 5 is a timing diagram illustrating the use of hashing channels, according to an embodiment of the present invention, in the hash block of FIG. 2.

FIG. 5 is a timing diagram illustrating the use, according to a specific embodiment of the present invention, of hashing channels 114 and 116 and storage areas HS0, HS1, and HS2 of hash memory 106. More specifically, FIG. 5 is a timing diagram illustrating the pipelining of data packets in a single IPSec data processing channel and the use of multiple hashing channels 114 and 116 (indicated by bracket 1111) for such data processing channel according to the present invention (hash channels 114 and 116 are also described below as "Hash Channel 0" and "Hash Channel 1").

Simplified representations of 64-byte blocks of data corresponding to data packets (indicated as packet 0, packet 1, and packet 2) are illustrated in FIG. 5 with the horizontal length of each of many cipher blocks 1102–1110 in the data processing channel corresponding to the processing time (the direction of which is indicated by the "TIME" arrow) to perform cipher operations on a 64-byte block in cipher block 102. Hash block 103 is described herein as having two hash channels 114 and 116; however, a skilled artisan will recognize that more than two channels could be used in other embodiments. Further, packets 0 and 1 are illustrated as containing two 64-byte cipher blocks for purposes of explanation. In actual operation, the packets may vary widely in size.

Now describing FIG. 5 in more detail, packet 0 contains cipher data blocks 1102 and 1104. Data block 1102 represents the time required to process this 64 bytes of data in cipher block 102. Similarly, block 1104 represents the time required to process the second 64 bytes of data in cipher block 102. As described above for hash block 103, once block 1102 has completed cipher processing, it enters a hash memory 106 storage area, for example, HS0. It should be noted that filling of hash memory 106 is done as and when, for example, 64-byte blocks of data are processed by cipher block 102. Assuming that Hash Channel 0 is not busy, then the 64 bytes of data enter Hash Channel 0 for hash processing. This is indicated as block 1112 in FIG. 5. In block 1112, "HASH 0" indicates Hash Channel 0 is doing the hashing and "(HS0)" indicates that the data were read from hash memory storage area HS0. While block 1112 is being hashed, block 1104 continues cipher processing.

Once block 1104 completes cipher processing, the data enters the next hash memory 106 storage area, which is HS1 in this example. Block 1114 corresponds to this data and has the notation "(HS1)" to indicate that the data was read from storage area HS1. Block 1114 also has the notation HASH 0 since all data for a given packet, here packet 0, are processed in the same hash channel. The security protocol for packet 0 calls for padding and HMAC processing operations (such as used in, for example, TLS) in hash block 103, so the second block of 64 bytes are read again from HS1 to perform these additional hash operations in Hash Channel 0 (as indicated by blocks 1116 and 1118).

While block 1114 is being hashed, cipher block 102 has completed cipher processing on packet 0 and has received data for block 1106 of packet 1 and begun cipher processing. Once block 1106 is done with cipher processing, the data is written to the next hash memory storage area in rotational order, which is HS2 in this example, and indicated in FIG. 5 as block 1122. Because successive data packets are typically processed using alternating hash channels 114 and 116, and in this example Hash Channel 0 was used for packet 0, packet 1 is processed in Hash Channel 1 (indicated as "HASH 1" in block 1122).

While block 1122 is hashed, second data block 1108 of packet 1 is cipher processed. Once block 1108 completes cipher processing, then the data is written to the next storage area in round-robin order as discussed above, which in this example is HS0, and indicated as block 1124 in FIG. 5. Hash Channel 1 is used to process block 1124 since this data is in packet 1, which is being processed through Hash Channel 1.

The next data packet, packet 2, has had some data written to an input FIFO (not shown) that precedes cipher block 102 as part of overall system pipelining in the data processing channel; however, block 1110 of packet 2 does not begin processing in cipher block 102 until one of hash channels 114 and 116 is free. Thus, once block 1118 completes processing, then block 1110 begins cipher processing. When block 1110 is complete, and the data is written to the next hash memory 106 storage area, which is HS1 in this example (and indicated as block 1120 in FIG. 5), hash processing starts in Hash Channel 0. Both Hash Channel 0 and Hash Channel 1 are free when block 1110 is ready for hashing, and packet 2 enters Hash Channel 0 since Hash Channel 0 has been arbitrarily selected as the default channel as mentioned above. While and after block 1120 is being hashed, additional data blocks (not shown) may continue to enter cipher block 102 as the above pipelining continues in a similar manner for processing additional data blocks and packets.

Conclusion

By the foregoing description, a novel system and method for hash processing have been described. The present invention has the advantages of handling SHA1 and MD5 hash operations in fewer effective clock cycles, making improved usage of buffering and working memory resources, and reducing the time dedicated to performing padding prior to hashing of data. The present invention also permits the hardware implementation of the hashing algorithms SHA1, MD5, HMAC-SHA1, HMAC-MD5, Double Hash, and Pseudo Random Function in TLS on a single chip. The present invention is useful in, for example, virtual private networking processing systems that implement IPSec, load balancers and web switches implementing, for example, SSL 3.0 and TLS 1.0.

Although specific embodiments have been described above, it will be appreciated that numerous modifications and substitutions of the invention may be made. For example, although a specific hardware implementation has been described above, other embodiments may use different hardware components and also may include software components. Accordingly, the invention has been described by way of illustration rather than limitation.

What is claimed is:

1. A hash circuit comprising:
a hash memory for receiving input data, wherein the hash memory is accessed using a plurality of address locations;
a hash channel, coupled to receive the input data from the hash memory, to hash the input data using a hash algorithm, wherein the hash channel is adapted to implement the hash algorithm in first and second rounds operating substantially in parallel; and wherein:
the hash circuit performs a first read access of the hash memory to provide a first data unit for processing in the first round of the hash algorithm and a second read access of the hash memory to provide a second data unit for processing in the second round of the hash algorithm;
the first read access further comprises reading and logically combining additional data units for processing in the first round of the hash algorithm; and
the second read access further comprises reading and logically combining additional data units for processing in the second round of the hash algorithm.

2. The hash circuit of claim 1 wherein the hash algorithm is a secure hash algorithm.

3. The hash circuit of claim 1 wherein the first data unit is a first 32-bit word and the second data unit is a second 32-bit word.

4. The hash circuit of claim 1 wherein:
the hash circuit reads the first data unit from only even address locations of the plurality of address locations; and
the hash circuit reads the second data unit from only odd address locations of the plurality of address locations.

5. The hash circuit of claim 1 wherein:
the logically combining of the additional data units from the first read access comprises the XOR'ing of a first set of 32-bit words; and
the logically combining of the additional data units from the second read access comprises the XOR'ing of a second set of 32-bit words.

6. A hash circuit comprising:
an adder adapted to implement the SHA1 algorithm, wherein the adder computes a first round and a second round of the SHA1 algorithm substantially in parallel, and implements a processing pipeline for each of the first and second rounds using an earlier clock cycle and a current clock cycle, the earlier clock cycle preceding the current clock cycle in time; and
a hash memory coupled to provide data to the adder for hash processing,
wherein for the first round, the adder is adapted to:
compute a Kt function value in the earlier clock cycle,
compute a non-linear function value in the earlier clock cycle,
receive a temporary variable he or hc input in the earlier clock cycle,
receive a read data input in the earlier clock cycle,
receive a shifted temporary variable ha input in the current clock cycle,
and
provide a temporary output; and wherein for the second round, the adder is adapted to:
compute a Kt function value,
compute a non-linear function value,
receive a temporary variable hd or shifted temporary variable hb input,
receive a read data input, and
couple the temporary output from the first round to be an input to the second round.

7. The hash circuit of claim 2 wherein for the second round, the adder is adapted to:
compute the Kt function value in the earlier clock cycle;
receive the temporary variable hd or shifted temporary variable hb input in the earlier clock cycle;
receive the read data input in the earlier clock cycle;
compute the non-linear function value in the current clock cycle; and
couple the temporary output from the first round in the current clock cycle.

8. The hash circuit of claim 7 wherein the adder comprises:
a first register to latch, for the first round, a first sum corresponding to the Kt function value, the non-linear function value, the temporary variable he or hc input and the read data input.
a second register to latch, for the second round, a second stun corresponding to the Kt function value, the temporary variable lid or shifted temporary variable hb input, and the read data input.

9. A hash circuit comprising:
an adder adapted to implement the SHA1 algorithm, wherein the adder computes a first round and a second round of the SHA1 algorithm substantially in parallel; and
a hash memory coupled to provide data to the adder for bash processing,
wherein the adder, for processing in the first round, comprises:
a first carry save adder to receive a non-linear function value, a Kt function value, and a temporary variable he or hc input;
a second carry save adder coupled to receive a read data input from the hash memory and an output from the first carry save adder;
a third carry save adder to receive a shifted temporary variable ha input and coupled to receive an output of the second carry save adder, and
a first register coupled between the second and third carry save adders; and wherein the adder, for processing in the second round, further comprises;
a fourth carry save adder coupled to receive a Kt function value, a temporary variable hd or shifted temporary variable hb input, and a read data input;
a fifth carry save adder to receive a non-linear function value and coupled to receive an output of the fourth carry save adder;
a sixth carry save adder coupled to receive a temporary output from the first round and coupled to receive an output of the fifth carry save adder; and
a second register coupled between the fourth and fifth carry save adders.

* * * * *